Sept. 9, 1969 V. THOMPSON 3,465,830
PORTABLE DIAMOND DRILL RIG
Filed March 13, 1967 7 Sheets-Sheet 3

INVENTOR
VAUGHAN THOMPSON
By [signature]
AGENT

Sept. 9, 1969  V. THOMPSON  3,465,830
PORTABLE DIAMOND DRILL RIG

Filed March 13, 1967  7 Sheets-Sheet 6

INVENTOR
VAUGHAN THOMPSON
By Frank J Page
AGENT

Sept. 9, 1969  V. THOMPSON  3,465,830
PORTABLE DIAMOND DRILL RIG
Filed March 13, 1967  7 Sheets-Sheet 7
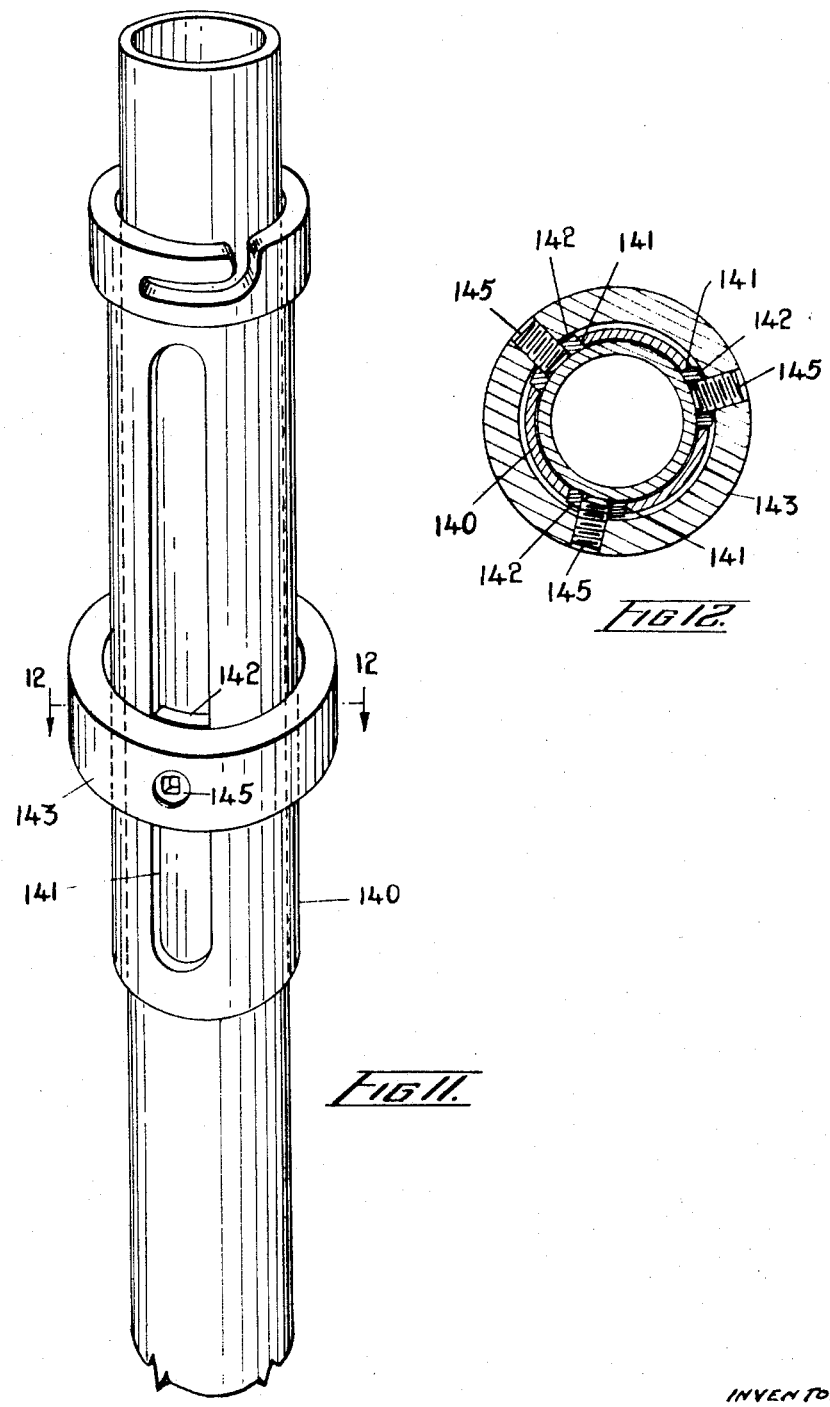

United States Patent Office 3,465,830
Patented Sept. 9, 1969

3,465,830
PORTABLE DIAMOND DRILL RIG
Vaughan Thompson, 290 Kerrybrook Drive,
Richmond Hill, Ontario, Canada
Filed Mar. 13, 1967, Ser. No. 622,494
Int. Cl. B23b 39/10; E21c 5/10
U.S. Cl. 173—152                                    13 Claims

ABSTRACT OF THE DISCLOSURE

A portable apparatus for diamond drilling earth formations including a drill support structure, means for rotating a drilling member and fluid-powered means for applying an axial force to the drilling member independently of the operation of the drill member rotating means.

This invention is directed to an improved drilling rig, and in particular to an air transportable light weight rig built up of units that may be dissembled and readily transported by hand or helicopter.

In conducting exploratory diamond drilling, it is often necessary to convey a drilling rig to inaccessible locations by means such as helicopters in order to conduct sample drillings over such features as geological anomalies and faults.

In order to satisfactorily carry out exploratory drilling of this nature it is essential that the drill be capable of drilling casing through relatively deep overburden in order that core drilling may be conducted in the ledge of rock strata underlying the overburden. While a suitable drill must be capable of exerting considerable drilling pressure to achieve overburden penetration, it should be at the same time be sensitive enough to permit the operator to readily detect when "grinding" occurs, during which condition the core within the coring bit is otherwise destroyed.

The present invention provides a light weight drilling rig particularly adapted for rapid disassembly into light weight components suitable for transportation in a small helicopter, adapted for assembly on the ground with a minimum of preparation of the site, and being of such high efficiency as to provide penetrating power to drill casing through overburden and at the same time providing sufficient hoisting power to pull drill rods from depths of the order of 500 feet or more. The drill according to the present invention accomplishes this by the elimination of the parasitic loads normally present with drill rigs previously used, while providing novel means for applying axial forces to the drill member.

In prior practice diamond drilling the drill is generally anchored to the ground and pressure is applied to the drill member through a rigid head. Under high drilling forces, as the anchor line securing the drill stretches the drill rears up, which produces misalignment between the machine and the drilling member thus producing high power consumption by way of parasitic bending loads exerted on the drill rods, forcing them to bear heavily against the wall of the hole. These loads in turn necessitate the use of heavier construction and the employment of greater driving power in order to deal with the extreme forces generated. It will be appreciated that in such prior drill rigs, a slight bend in a drill rod set in a rigid drill head produces a constant parasitic bending load varying cyclically with rotation of the drill and consuming appreciable energy that it not deliverel productively to the cutting bit. The heavy construction and related high powers involved resulted in drill rigs completely unsuited for low cost transportation to inaccessible areas, thus imposing economic, seasonal and practical difficulties in the carrying out of exploratory diamond drilling such as that of remote promising strata detected by aerial magnetometer survey methods.

An object of the invention is to provide a light-weight highly efficient drilling rig particularly adapted for disassembly and transportation by light-weight helicopter, canoe, manually or any convenient means.

Another object of the present invention is to provide a drill rig in which axial loading and hoisting means are separated from the rotary drive assembly of the drill.

A further object of the present invention is to provide a drill rig having an axial force unit that is substantially unaffected by dimension changes caused by high anchor forces necessary for drilling.

The present invention provides a drill rig capable of deep drilling casing and core drill through heavy overburden, comprising: a demoutable, adjustable angle drill support structure; first drill operating means mounted thereon to provide powered rotation through a first universal mounting of a drilling member; and second fluid-powered drill operating means to apply pressure responsive axial force to the drilling member through a second universal mounting independently of the operation of the rotary motion produced by the first operating means.

The present invention further provides an air transportable drill rig having a dismountable support frame, motor means detachably secured thereto, first drill operating means in mechanical driven relation with the motor to provide rotation of a drilling member, second drill operating means including a hydraulic actuator connected to the drill member by way of a water swivel pressure chuck to provide axial displacement force thereto and selectively variable delivery pressure pump means driven by the motor means and connected to the hydraulic actuator to provide selective pulling and pushing operation thereof.

An embodiment of the present invention is described by way of example, reference being had to the accompanying drawings wherein:

FIG. 4A is an alternative detail of the transmission shown in FIG. 4;

FIG. 10 is a diagrammatic arrangement showing the pump arrangement and hydraulic circuit; and FIGS. 11 and 12 are end and side views of the casing drive chuck arrangement.

Figure 1:
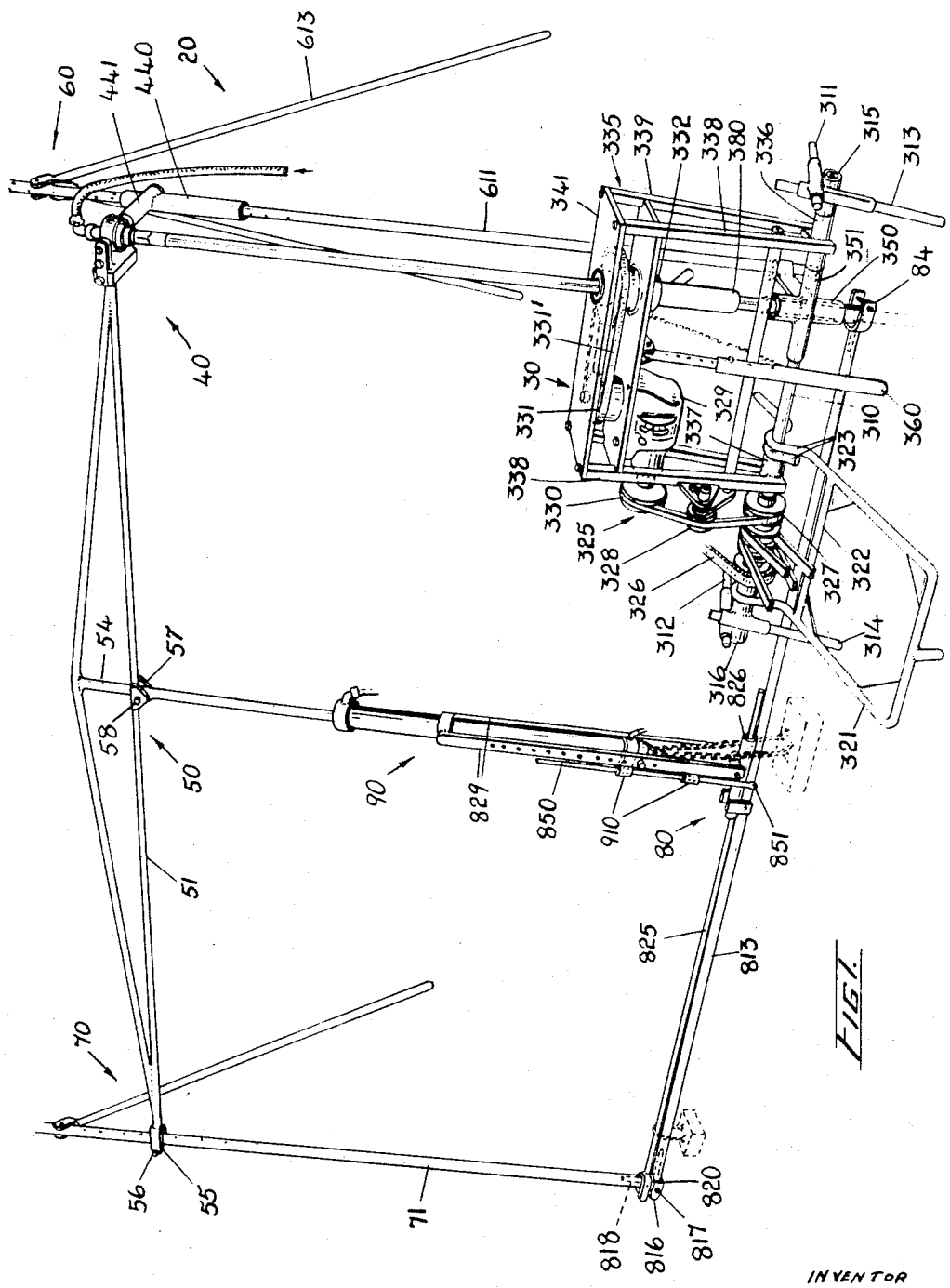
FIG. 1 is a general view of the drill rig with the prime mover and pump means detached therefrom.

Referring to FIG. 1 the drill rig 20 comprises a drill rotational assembly 30, a separate drill thrust assembly 40, a walking beam 50 connected thereto, a thrust guide tripod assembly 60 for guiding the thrust assembly 40, a beam support bipod 70 to support the far end of the walking beam 50, a lateral space frame assembly 80 and a power cylinder 90 connected to the walking beam 50 to provide pushing and pulling of operation thereof.

Figure 2:
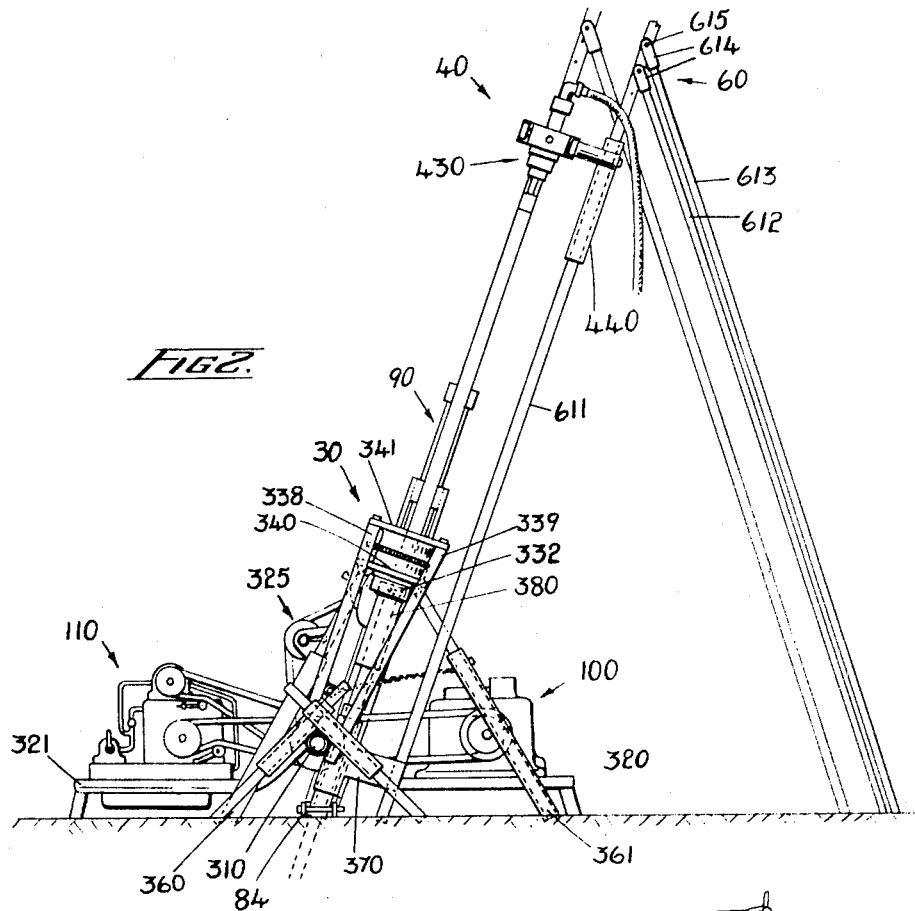
FIG. 2 is a side elevation view corresponding to FIG. 1, with the prime mover attached.

The relative positioning of the prime mover assembly 100 and the pump assembly 110 is shown in FIG. 2.

Figure 3:
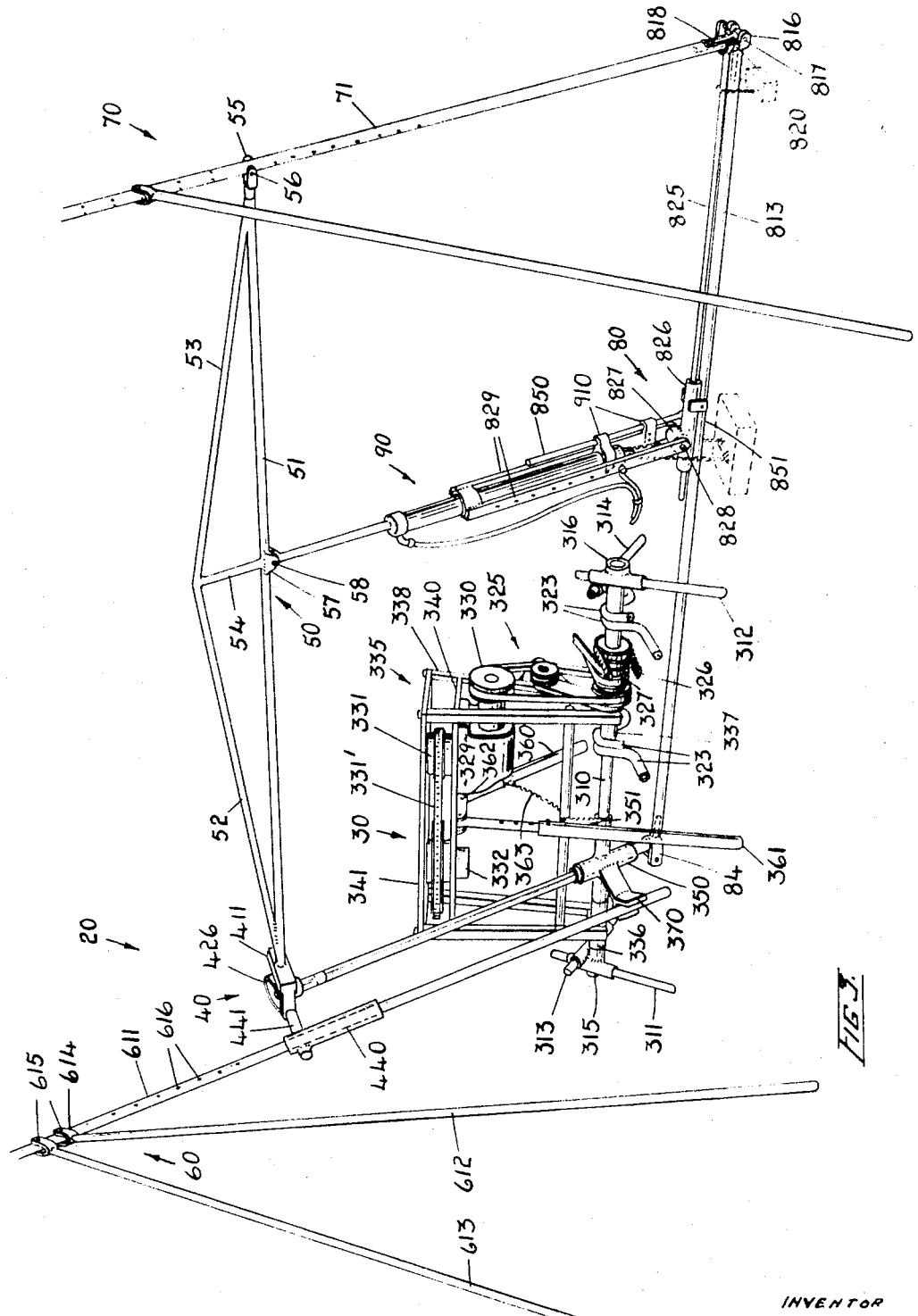
FIG. 3 is a view corresponding to FIG. 1, with the rotary drive head in the disengaged position.

Referring initially to FIGS. 1, 2 and 3 to describe the general function and interrelation of the component groups, a transverse king bar 310 has mounted on it a casing guide tube 350 through which the drilling operation takes place. A lateral spacer frame assembly 80 is secured to the guide tube 350 by means of a yoke 84, the actuator cylinder assembly 90 being shown pivotally mounted thereon at its centre portion, and the bipod assembly 70 shown pivotally mounted at its outer end.

The guide post member 611 of the thrust assembly guide tripod 60 extends upwardly substantially parallel with the drilling member, being braced apart from the guide tube 350 by means of a notched spacer plate 370 extending therebetween.

The prime mover assembly, comprising a portable gasoline motor, is located to one side of the king bar 310, the dual pump assembly 110 being located oppositely thereto, for convenience of arrangement and control.

The walking beam assembly 50 which applies axial loading to the drilling member through the drill thrust assembly 40 comprises a bottom tube 51 having strut members 52, 53 secured in bracing relation thereto by an intermediate brace member 54, being secured at its outer end to the bipod assembly 70 by way of a pivot fork 55 having a securing pin 56 extending therethrough. The upper end of the actuator 90 is secured to the walking beam assembly by means of an attachment lug or lugs 57 and an attachment pin 58.

The actuator 90, which is double acting, is supplied with actuating fluid by means of the pump assembly 110, which in turn is powered by the prime mover 100 by means of belt drives. The actuator 90 which is required to supply both upward and downward loading forces to the drilling member is secured against upward motion by anchoring means such as an earth anchor, dead man, or an anchor pin drilled into the bed rock in the case where the rig is mounted on or closely overlying a rock surface.

The spacer frame assembly, bipod frame, acuator and walking beam are connected by simple pinned joints permitting free motion of the arrangement in their common plane, coincident with the guide post of the tripod assembly.

In operation, the prime mover 100 provides a rotary output drive to a final chuck drive 332 by means of which rotation of the drilling member is produced, while at the same time the prime mover 100 drives the pump assembly 110 to provide pressure fluid to the actuator 90 which applies axial loading force on the drilling member through the drill thrust assembly 40 by way of the walking beam 50. Referring to the device when operating as shown in FIG. 3, the drill rotational assembly 30 is shown in a position swung clear of the drilling member, to permit the drill string or casing to be withdrawn from the hole.

Dealing in greater detail with the component assemblies, the transversely extending king bar 310 is secured to the casing guide tube 350 by means of a casing guide tube sleeve 351, which accepts A size casing, or E size casing with an adapter sleeve, the king bar 310 being supported at its outer ends by means of fixed length support legs 311, 312 and adjustable legs 313, 314 being adjustable in length by spring loaded ratchet means (not shown), the legs being secured to sleeves 315, 316 through which the king bar 310 extends.

The prime mover assembly 100 and the pump assembly 110 are mounted on support frames as illustrated, having side members such as 320, 321 joined by a cross brace 322 and secured to the king bar 310 by means of dropover hook members 323. The support frames each have a single rear ground leg to provide 3-point stability to the frames, constant belt tension being unaffected by the angular position of the support frames.

The rotary input drive train 325 comprises a primary input pulley 326 driven by a belt from the prime mover 100, being mounted for rotation about the king bar 310 in fixed driving relation with a plural group of reduction pulleys 327, one reduction pulley driving the rotary head, another the variable displacement pump, and a third the booster pump. A substantially vertically extending belt which is tensioned by an adjustable pulley 328 drives the input pulley 330 of a speed reducer 329, to provide rotary output of the output member 331, shown coupled by means of a chain drive 331' to the final chuck drive 332. When a low speed, high torque drive is required at the final drive chuck 332, a chain 331' is used, connecting the relatively small diameter sprocket on the member 331 with the relatively large diameter sprocket on the member 332 to provide the high torque required when driving casing. However, when higher speed, lower torque driving is required a triple V-belt arrangement as illustrated in FIG. 4A, driven by three corresponding V-belts mounted on the output member 331 of the speed reducer 329 provides sufficient torque to drive the core drilling member under usual drilling conditions when ledge is being penetrated. On connecting the chain, when the low speed, high torque drive is required, the triple V-belts may be slipped off their related pulleys, to avoid disassembly of the head structure, or otherwise untensioned.

The structure of the assembly 30 includes an assembly support frame 335 pivotally mounted on the king bar 310 by means of mounting sleeves 336, 337 to which end-frame legs 338, 339 are secured. The speed reducer 329 is secured to a lower plate 340, while an upper plate 341, shown fitted in place, serves both as a mounting and a protective plate for the drive between the reducer output 331 and the final chuck drive 332, which as before stated may be either a chain drive or a multi-V-belt drive.

By virtue of the pivotal mounting arrangement, the rotational assembly may be pivoted about the king bar 310 and may be moved out-of-line with the drill hold, after the drilling member has been withdrawn from the chuck drive. The assembly is supported in the drilling or the drawing position by means of extensible assembly positioning legs 360, 361 pivotally mounted on a bracket 362 secured to the lower plate 340, the legs 360, 361 having an interconnecting chain 363 extending therebetween to provide desired relative positioning.

Figure 7:
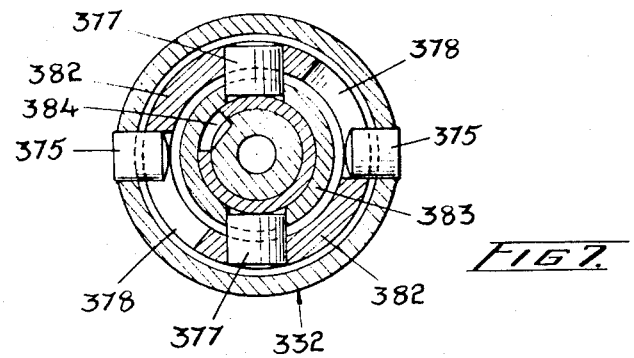
FIG. 7 is a section on the line 7—7 of FIG. 4.
Figure 8:
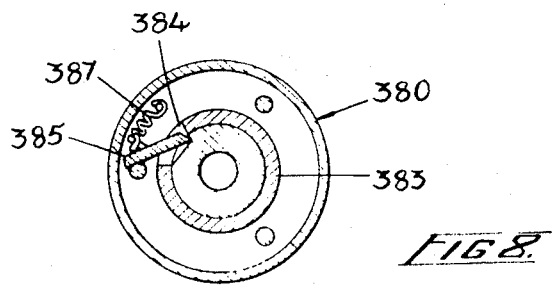
FIG. 8 is a section on the line 8—8 of FIG. 4.
Figure 9:
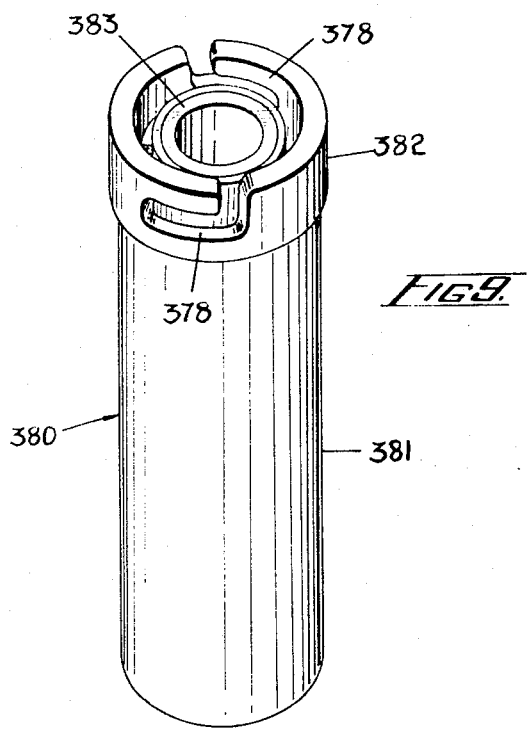
FIG. 9 is a general view of the drill rod drive chuck.

The final chuck drive 332 is provided with a universal bearing illustrated in FIG. 7, comprising gimbal pins 375 pivotally supporting an intermediate annular ring 382 which in turn carries a pair of gimbal pins 377 having a common axis normal to the common axis of the pins 375. The inner set of gimbal pins 375 extends radially inwardly to engage the slots 378 of the rod drive chuck 380.

The rod drive chuck 380 comprises a cylindrical body portion 381 having a collar portion 382 in which the slots 378 are recessed, and an inner annular sleeve 383, extending substantially the full length of the sleeve member 381 having an axially elongated slot 384 extending therealong for the greater portion of its length through which an upper pawl member 385 and a lower pawl member 386 project, being pivotally mounted and resiliently loaded by the spring 387 to extend radially inwardly through the slot 384 in rotary driving connection with the grooved drill rod received therein. Owing to the use of an unslotted coupling between adjacent rods and the existence of an unslotted portion of drill rod adjacent the coupling, the upper and lower pawl members are in axially spaced relation, to maintain pawl driving contact during passage of the unslotted portion of the rods and the coupling through the chuck.

Referring to the arrangement of the rod drive chuck 380 shown positioned beneath the final drive 32, it will be appreciated that by inverting the member 332 to an upside down position it is possible to have the chuck 380 positioned above the drive 32 to facilitate insertion and removal of the chuck from the final drive, while also permitting a reduction in the height of the assembly support frame 335.

The stay member 370 secured to the guide tube 350 comprises a distance piece having a bifurcated end adapted to receive the guide post member 611 in the bight thereof.

The tripod assembly 60 comprises a guide post member 611 which is mounted in the desired angular position by means of twin support legs 612, 613 pivotally secured to the guide post 611 by means of securing brackets 614 having pivot pins 615 extending therethrough to engage the guide post 611, which includes a series of transverse pin holes 616 to permit adjustment of the support legs 612, 613 in relation to the guide post member 611. One arrangement which, although not illustrated, has been found to be of particular advantage is the provision of a cantilevered lateral arm extending outwardly from the tripod assembly at the upper end thereof to receive drill members in upstanding supported relation when removed from the drill string.

Referring to the type of drill members used, utilization of the presently provided drill head requires the use of grooved rotary drilling members or drive rods, which are provided generally in five foot lengths, being of the type utilizing an intermediate flush coupling, for which purpose the upper and lower pawl drive members are provided. Attempts to operate with a single driving pawl have not proved generally successful, as the problem of securing adjoining five foot lengths of drive rod in exactly aligned relation, to provide a continuous groove were not readily overcome. The drive rods are coupled to a standard drill rod, generally used in ten foot lengths by the usual intermediate male threaded coupling member, and having an axial water passage extending therethrough.

Figure 4:
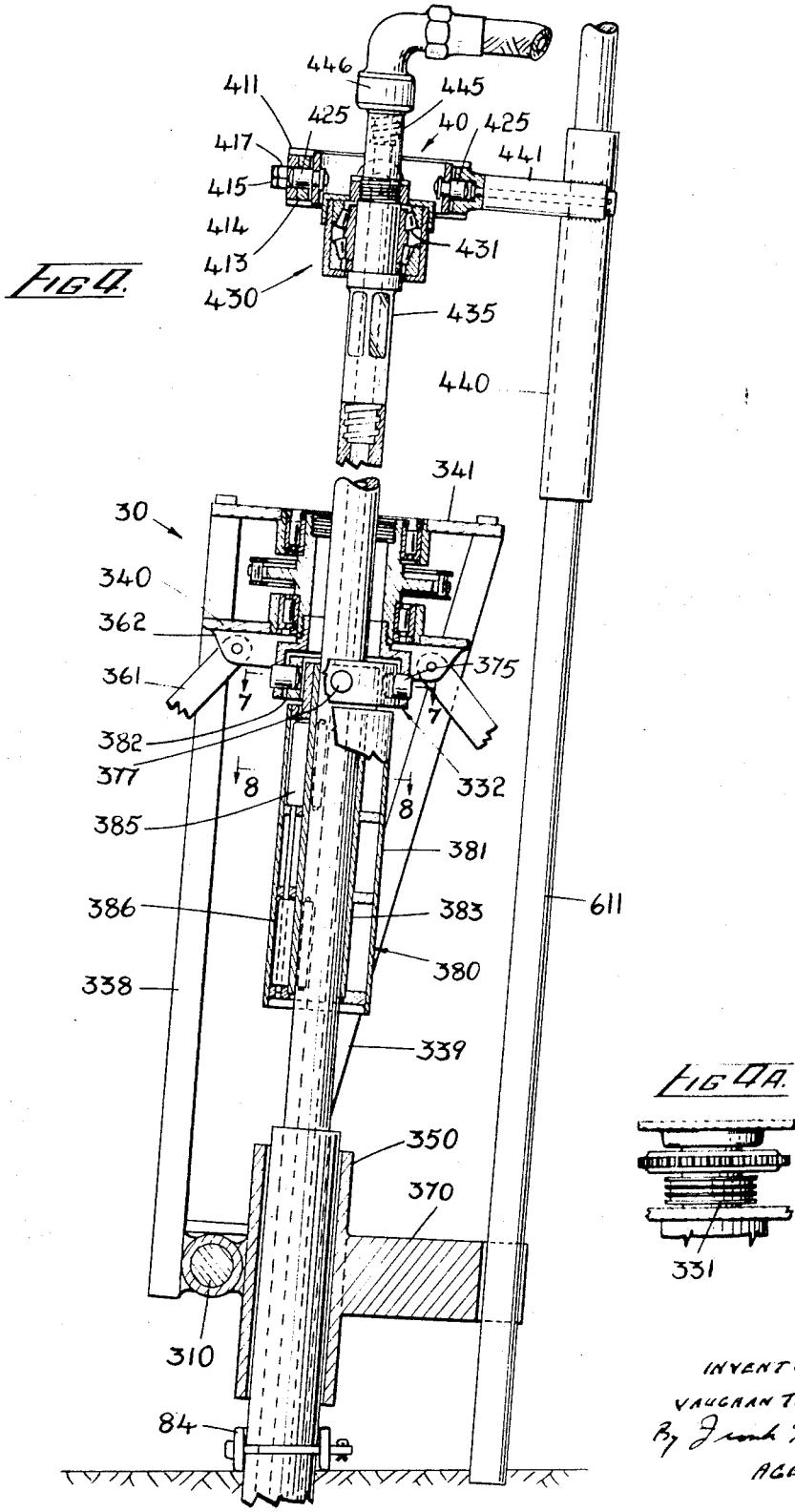
FIG. 4 is a transverse longitudinal section on the drill main axis showing details of the water head and thrust bearing, the drill head chuck attachment and the casing locating sleeve.
Figure 5:
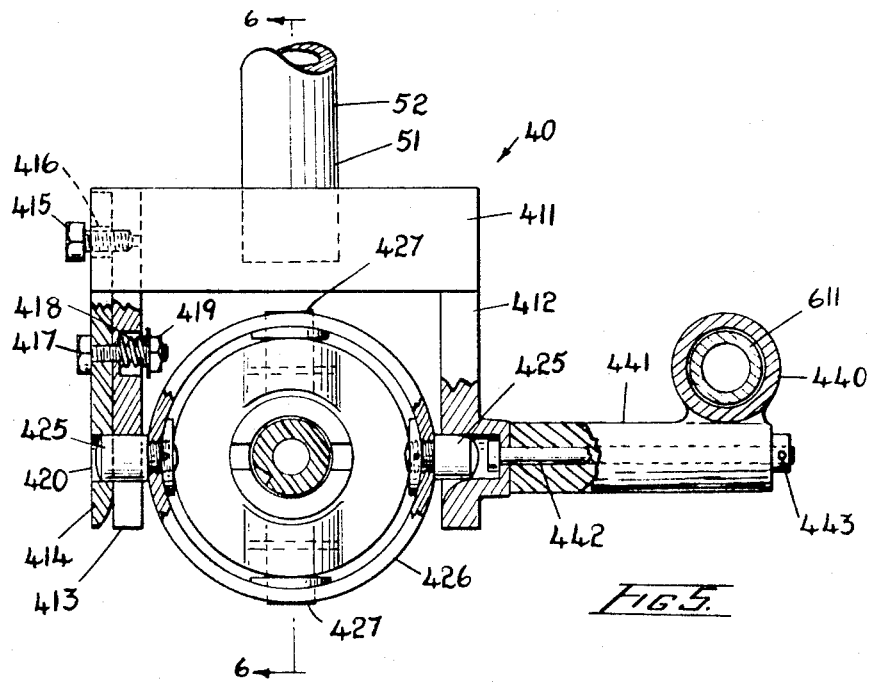
FIG. 5 is a section plan view of the water swivel head attachment on the line 5—5 of FIG. 6.
Figure 6:
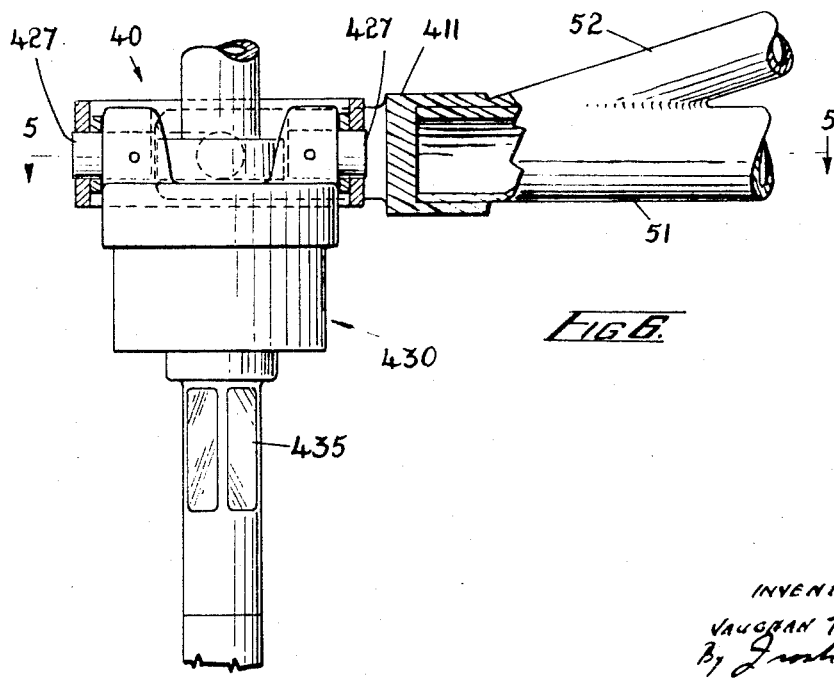
FIG. 6 is a side elevation in section of the water swivel taken on the line 6—6 of FIG. 5.

Referring now in detail to the drill thrust assembly 40, which comprises a so-called "water swivel," as illustrated in FIGS. 4, 5 and 6, this comprises a fork assembly having a member 411 secured to one end of the walking beam assembly 50 either by welding or by means such as a pivot pin permitting angular adjustment of the walking beam assembly 50 about the axis of its bottom member 51. A pair of side members 412, 413 extend from the back member 411, the side members 413 having an outer side member 414 resiliently attached thereto by means of a locating bolt 415 extending through a clearance hole 416 in the side member 414, in spring loaded relation therewith by means of a second locating bolt 417 and a compression spring 418 adjustably secured by a nut 419. A recess 420 receives one of a pair of outer gimbal pins 425 mounted on an outer gimbal ring 426, having a second pair of gimbal pins 427 extending inwardly therefrom in securing relation with a water swivel having thrust bearing assembly 430. The assembly 430 includes a pair of taper thrust bearings 431 in back-to-back relation securing an output thrust adapter 435 in axially fixed rotatable thrust relation.

The gimbal portion of the drill thrust and water swivel assembly 40 is secured to a slide sleeve 440 for axial sliding movement parallel with the guide post member 611, by means of an intermediate tube portion 441 through which a pivot pin 442 extends, being secured in place by a cotter pin 443 or similar securing device.

The water connection 445 of the water swivel is secured to the stationary top cover of the bearing assembly 430, being provided with a coupling 446 by means of which an elbow and drill flushing water supply can be attached, from a source (not shown).

Referring in detail to the lateral spacer frame assembly 80, the lower spacer bar 813 provides lateral spacing between the guide tube 350 and the bipod front member 71 by means of an upwardly extending bipod mounting rod 818 pinned by means of the pin 817 to the end yoke 816 of the lower spacer bar. An annular plate 820 fitted over the mounting rod 818 and secured to the bipod leg 71 is overlayed by a second spacer bar or tube 825 lying on top of the plate 820. A sleeve member 826 slidably mounted on the member 825 has a transverse tubular housing 827 attached thereto to receive a pivot bolt 828 by which side arms 829 holding the power cylinder 90 are secured.

An actuator guide rod 850 is secured by pivot pin 851 to the lower spacer bar 813, extending upwardly to enter guide tubes 910 secured to the outside of the cylinder of the actuator 90, which is located within the guides 829. A chain from the anchorage passes upwardly in securing relation around the sleeve member 826 and tube 825, which is free to move upwardly as the chain stretches, when the actuator 90 is contracted to provide downward thrust on the drill rod member. This upward movement of the tube 825, due to chain stretch, does not affect the lower spacer bar 813, which is indirectly connected at its centre to the actuator 90 and the upper spacer bar 825 by the guide rod 850, and at its outer end by the sliding plate 820 of tube 825. The outer end of the spacer bar 813 adjacent the bipod is anchored relatively lightly to the ground, and must be able to hold the weight of rods and to restrain this portion of the frame against undue movement when hoisting a drill string.

By making the spacer frame assembly of greater span than the walking beam, by a matter of a few inches, approximately equal to one-half the transverse deflection of the upper end of the bipod produced by a full stroke of the actuator and walking beam, the bipod will then occupy an intermediate upright position, and will pivot towards and away from the tripod in substantially equal arcs of movement, in accommodation to the walking beam movement.

Referring to the pumping arrangement illustrated diagrammatically in FIG. 10, the prime mover 100 provides a drive through an intermediate drive pulley centered on the king bar, by way of V-belts to a variable stroke high pressure pump 115 of low volume displacement and a large volume booster pump 120, each of these pumps being suitably equipped with a belt tensioning device to permit engagement or disengagement as required, as is well known. A simple two-way control valve 125 shown mounted on the reservoir 130 which supplies the required hydraulic fluid directs the pressure from one or other of the two pumps to either the upper or the lower end of the actuator 90, the pumps being arranged in parallel flow arrangement. An over-pressure relief valve, not shown, is provided for safety purposes, having a relief setting in excess of the maximum operating pressure of the pumps.

The variable displacement pump 115 is of the swash plate type, having a pressure-responsive servo cylinder incorporated therein, as is well known in the art. The angular position of the pump pressure-regulating control arm is determined by a variable tension spring, to control the pressure output of the pump to a selected value in the range from about 200–1400 lbs. per square inch. The pressure is isolated from the booster pump 120 by means of a check valve 122.

The booster pump 120 is normally disengaged except when high rates of pumping are required under relatively low load conditions as when pulling drill rod, at which time the booster pump is engaged by tensioning the belt drive thereof, at which time the other pump remains engaged.

It has been found by experience that while the direction of pumping of high pressure fluid to the actuator can be effected solely by reversal of the inclination of the swash plate of the variable displacement pump, this has generally disadvantageous affects upon the pump, so that the incorporation of the two-way selector valve 125 has been found to be beneficial to pump operation.

A manually controllable bleed valve, not shown, is provided in the actuator return line to permit close control of the rate of actuator motion when the string tends to drop under its self-weight, thus substantially preventing the occurrence of "mudding in" that occurs with too rapid descent of the string.

Owing to the operation of the walking beam under a selected fixed pressure head, requiring only minor power as there is no undue pumping of hydraulic fluid, so that the question of undue heating does not arise as in the case of a system employing a bypass pressure relief valve, and the hydraulic fluid reservoir 130 can be of unusually small dimension, in the order of two gallons.

When it is desired to use the drill rig in order to drive casing, which is generally the preliminary step to exploratory core drilling by drilling casing equipped with a diamond shoe bit through the overburden, which may be in the order of 300 feet in depth, a casing chuck as illustrated in FIGS. 11 and 12 is employed. This chuck comprises a tubular body 140 having three axial key-ways 141 mutually spaced at 120 degrees extending for the majority of the length of the chuck body 140, into which the three drive nuts 142 extend radially. These drive nuts 142 are mounted upon a drive collar 143 which circumscribes the chuck body 140. Set screws 145 extending through the drive nuts 142 engage the outer surface of the casing. The casing chuck is mounted in the output drive member 332 of the rotary head by grooves receiving chuck gimbal pins 377, corresponding to grooves 378 of the chuck 380. Axial drilling pressure is applied from the thrust head by means of an adapter operating against the end face of the casing, forming a water tight joint therewith, to permit the ready maintenance of water supply to the casing drilling head.

It will be understood that it is necessary for the driving collar 143 to be released and re-positioned from the casing, when it reaches the extent of its travel within the casing chuck body 140.

Referring to the operation of the rig, in a test rig employing an actuator of 3-foot stroke, of approximately three inch bore, the six foot pressure stroke produced by a full stroke of the actuator permits ready drilling using five foot lengths of grooved drive rod.

The pulling of the drill rod or the casing is effected by means of a gripping device detachably mountable on the rod or case as required, and attached to the adjacent end of the walking beam by suitable pulling means such as a chain.

Owing to its high sensitivity due to the elimination of parasitic loads and the ease with which the constantly rotating drill can be thrust downwardly, an operator can readily detect changes in drilling rate that may indicate grinding of the core. The drawing of the drill before this condition progresses makes it possible to salvage a very high percentage of core, even under difficult core sampling conditions, thus greatly enhancing the accurate assessment of the strata being cored.

While the rig is illustrated with the walking beam having the actuator mounted in the central position, to give a 2-to-1 stroke ratio at the head, it is possible to adapt the rig, with the actuator and the bipod interchanged, giving a 1–1 stroke ratio, permitting approximate doubling of the axial forces applied to the drill string, for a given actuator, and enabing the withdrawal of casing from difficult overburden. Such reversed arrangement requires the provision of an adequate anchor to the actuator.

By arranging the components of the rig about a king bar, ready assembly is promoted, and constant belt tensions are assured.

In an embodiment used in the field, the component sub-assemblies did not generally exceed 150 lbs. each, and were readily assembled, being lifted into the drill site by a very small helicopter, at minimum cost.

By using A or E size casing in the chuck, considerable versatility of operation is provided and casing has been sunk and drawn to 300 feet of difficult overburden, using the light-weight rig with core drilling carried out to the 700 foot level, through this casing. B size casing of 2½″ diameter may also be driven, using a motor of less than ten horsepower driving in 2½ foot lengths through use of an adapter beneath the chuck.

Owing to the simplified controls comprising the engine throttle to control head rotation speed, which also can be varied by different pulley ratios, a pump pressure setting handle, and the fluid direction control valve, the rig is easily controlled and operated in drilling and drawing operation, so that high rates of drilling are obtainable with minimum operator effort. This facility is enhanced by the separation of axial feeding effort from the rotational drilling effort.

The provision of universal connections, both at the rotational and the thrust heads reduces parasitic losses to a minimum and provides satisfactory operation with simplified structures of robust and light-weight construction.

The provision of a spacer frame and walking beam to transmit axial force to the drill string and casing provides the particular advantage of locating the necessary drilling anchorage relatively remotely from the drill hole. This is of particular value when it is necessary to utilize a ground anchor of the type employing sucessive rows of tied stakes driven into the ground substantially at right angles to the angle of inclination of the drill.

A particular and unobvious advantage afforded by the present invention is the ease with which a driving collar can be utilized for drawing jammed case, while maintaining a constant withdrawal force to optimise the effect of blows against the driving collar.

In the case where severe anchorage difficulties are encountered, the adoption of the walking beam arrangement in which the actuator and the bipod are interchanged to position the actuator at the remote end of the walking beam provides the advantage of reducing the anchorage force by one half.

A rig built according to the present invention has been resolved into four loads, comprising the reservoir and controls, the motor, the frames and the walker beam, none of which exceeds 150 lbs. in weight, to facilitate manual manoevering and air handling.

The present invention thus provides a light weight manually portable diamond drill that can be readily transported by a light plane or a small helicopter for use in inacessible places and does the work that would otherwise require a heavy high powered drill, which would involve high transportation and operating costs on jobs that, for the most part, are short exploratory anomaly testing, but that often require a drill capable of drilling casing into ledge, through deep difficult overburden. The drill has the ability to drill through substantially all types of overburden, and can apply the high drilling pressure necessary to get maximum efficiency and footage from diamind bits. Its operation is highly efficient and hoisting powerful enough to pull rods from depths of over 500 feet or to pull casing from a finished hole. By eliminating the usual parasitic surface loads that often exceed the useful load, lighter weight structure and lower cost, less specialized materials are required and high efficiency is achieved with optimum utilization of lower power generally used.

Owing to the exclusion of undue and parasitic loading the component reliability is high, while the use of readily transportable and replaceable sub-assemblies ensures ready maintenance in the field.

The embodiments of the invention in which an exclusive property or privilege is claimed are defined as follows:

1. A drill rig for drilling core drill and casing through overburden, comprising a demountable, adjustable angle drill support structure, first drill operating means mounted thereon to provide powered rotation through a first universal mounting of a drilling member, and second fluid-powered drill operating means to apply pressure responsive force to the drilling member through a second universal mounting independently of the operation of the rotary motion produced by said first operating means.

2. A drilling rig as claimed in claim 1 wherein said first operating means includes rotation transmitting clutch means receiving a said drilling member in co-axial sliding relation therein to provide rotation thereto independently of axial movement of the drilling member in response to said second drill operating means.

3. A drill rig as claimed in claim 2 wherein said support structure includes elongated guide means adjacent to and substantially parallel with said drill member, said second operating means including an offset long stroke linear actuator connected to said drill member in axial force applying relation by means of a walking beam arrangement, pivotally secured to an axial pressure chuck.

4. A drilling rig as claimed in claim 2 wherein said first operating means includes a rotary drive sleeve having an axially elongated tubular clutch detachably secured thereto by universal mountings and including two dog members resiliently biased to engage an axially extending slot on said drilling member.

5. A drilling rig as claimed in claim 4 wherein said first operating means includes a rotary drive sleeve having an axially elongated tubular clutch detachably secured thereto by universal mountings and including radially adjustable gripping means to grip casing in positive rotational engagement, said gripping means being mounted for axial sliding movement relative to the axially elongated tubular portion of the clutch.

6. A drilling rig as claimed in claim 4 wherein said two dog members are spaced axially apart to permit axial passage therethrough of coupling means connecting adjacent portions of said drill member, while maintaining positive rotational drive to said drill member by one or other of said dog members engaging a said slot.

7. A drilling rig as claimed in claim 1 wherein said first drill operating means is tiltably mounted on a transversely extending portion of said support structure to permit angular displacement thereof to clear the axis of said drilling member, to permit unrestricted access thereto by said second operating means for pulling a drill string.

8. A drilling rig as claimed in claim 3 wherein said first drill operating means includes a variable ratio mechanical transmission to drive said drilling member at a preselected substantially constant rate of rotation, said second operating means including a hydraulic pump of variable pressure delivery providing pressurized hydraulic fluid to a double-acting linear actuator in extending or contracting sense.

9. A drilling rig as claimed in claim 8 wherein the outward pressure of said hydraulic pump may be set at a predetermined value by a single control lever, the delivery thereof in extending or contracting sense to said actuator being controlled by a second lever in controlling relation with a two-way fluid distribution valve.

10. An air transportable drill rig having a dismountable support frame, motor means detachably secured thereto, first drill operating means in mechanical driven relation through a universal mounting with said motor to provide rotation of a drilling member, second drill operating means including a hydraulic actuator connected to said drill member by way of a universally mounted water swivel pressure chuck to provide axial displacement force thereto independently of the rotation produced by said first drill operating means, and selectively variable delivery pressure pump means driven by said motor means and reversibly connected to said hydraulic actuator to permit the selective application of pulling or pushing axial force to a drilling member.

11. A drill rig as claimed in claim 10 wherein said hydraulic actuator is pivotally connected to the drilling member by a beam member pivotally mounted in force transmitting relation therewith.

12. A drill rig as claimed in claim 11 wherein said beam member is pivotally supported at one end remote from the drilling member, said actuator being connected to the beam intermediate the ends thereof in force transmitting relation with the drilling member.

13. A high flow rate low pressure pump connected in parallel pumping relation with a low flow rate high pressure pump for use with a drilling rig to provide hydraulic pressure thereto, said pumps being selectively drivable by tensionable belt means to provide low volume, high pressure hydraulic fluid to an actuator for axially inserting a drilling member against ground resistance, and to provide high volume low pressure hydraulic fluid to said actuator for axially withdrawing said drilling member against a component of the weight of the drilling member and axial ground frictional load acting thereagainst.

References Cited

UNITED STATES PATENTS

| | | | |
|---|---|---|---|
| 5,932 | 4/1830 | Overall | 175—162 |
| 740,521 | 10/1903 | Brown | 175—162 |
| 1,316,497 | 9/1919 | Miller | 175—203 X |
| 2,635,855 | 4/1953 | Gunning | 173—152 X |
| 2,653,795 | 9/1953 | Reeves | 175—162 X |
| 2,969,121 | 1/1961 | Wallace | 173—152 X |

NILE C. BYERS, JR, Primary Examiner